United States Patent [19]

Koblasz et al.

[11] 4,081,858
[45] Mar. 28, 1978

[54] SYSTEM FOR COMPUTING WIENER KERNELS

[75] Inventors: Arthur J. Koblasz, Sierra Madre; Derek H. Fender, Altadena; Syozo Yasui, Pasadena; Cornelis M. Dekker, Duarte, all of Calif.

[73] Assignee: California Institute of Technology, Pasadena, Calif.

[21] Appl. No.: 715,703

[22] Filed: Aug. 19, 1976

[51] Int. Cl.² .................. G06F 15/42; G06F 15/34
[52] U.S. Cl. ......................... 364/553; 324/57 N; 364/488; 364/728
[58] Field of Search ............... 235/181, 150.53, 151.3; 324/77 A, 77 B, 57 N; 364/553, 488, 728

[56] References Cited

U.S. PATENT DOCUMENTS

| | | | |
|---|---|---|---|
| 3,586,846 | 6/1971 | Ley | 235/181 |
| 3,694,643 | 9/1972 | Smith | 235/181 |
| 3,718,813 | 2/1973 | Williams et al. | 235/181 |
| 3,973,112 | 8/1976 | Sloane | 235/151.3 |
| 3,988,667 | 10/1976 | Roth et al. | 324/77 B |

Primary Examiner—Felix D. Gruber
Attorney, Agent, or Firm—Lindenberg, Freilich, Hornbaker, Wasserman, Rosen & Fernandez

[57] ABSTRACT

Equipment is provided for determining the characteristics of a linear or non-linear system from its output $y$, for a quasi-random input $x$. The non-linear system may be a biological system. The computer described calculates first and second order kernels from the input signals applied to the system and the output signals received from the system.

12 Claims, 4 Drawing Figures

SYSTEM FOR COMPUTING WIENER KERNELS

ORIGIN OF THE INVENTION

The invention described herein was made in the course of work under a grant or award from the Department of Health, Education and Welfare.

BACKGROUND OF THE INVENTION

1. Field of the Invention

This invention relates to a computing system for performing first and second order correlations between the inputs to and outputs from a linear or non-linear system, whereby that system may be characterized, and more particularly to improvements therein.

Techniques of linear system theory have been used extensively in the study of non-linear systems. There are two principle reasons for this: the simplicity and completeness of linear theory; and the difficulty of linking non-linear analysis with functional entities. Often such systems have been studied with linear techniques using small signal approximations or by making certain linearizing assumptions about the system's behavior. Certain specialized methods for non-linear systems' analysis exist, however all these methods have serious limitations and are applicable to rather narrow classes of non-linear systems.

Starting with Norbert Wiener's original work (Non-Linear Problems in Random Theory, Wylle, New York, 1958), a general theory of non-linear system analysis and synthesis has been in development. This theory assumes only time-invariance and finite memory, therefore it is applicable to many physical and living systems. Wiener proposed that a non-linear system could be identified by its response to a Gaussian white-noise stimulus, and with such an input, the system is tested effectively with all possible inputs, (in practice with a great variety of inputs, depending upon the length of the experiment). Wiener's original formulation wasn't practical for experimental applications (Marmarelis, 1972), but Lee and Schetzen, in a work entitled "Measurement of Kernels of a Non-Linear System by Cross Correlation," Quarterly Progress Report No. 60, Research Laboratory for Electronics, Massachusetts Institute of Technology, 1965, proposed a simpler formulation in terms of cross-correlation calculations. This modification of the Wiener technique provides a feasible approach to analyzing time-invariant, finite memory systems.

Given a system with Gaussian, white-noise input $x(t)$ and output $y(t)$ we have:

$$y(t) = F[x(t)]$$

Wiener showed that the functional F can be rewritten as the following series:

$$y(t) = h_0 + \int_0^\infty h_1(\tau) \times (t - \tau) d\tau$$
$$+ \int_0^\infty h_2(\tau_1, \tau_2) \times (t - \tau_1) \times (t - \tau_2) d\tau_1 d\tau_2 - P \int_0^\infty h_2(\tau, \tau) d\tau$$
$$+ \ldots \text{higher order terms,}$$

where P is the power spectral density of the "quasi-random" input and by definition is a constant.

The set of kernels ($h_0, h_1, h_2, \ldots$) completely characterizes the system. Each kernel $h_n$ is a symmetric function of its arguments. The kernels describe quantitatively the non-linear cross talk between different portions of the past of the input as it affects the system response at the present, i.e., how much the response to $n$ different pulses deviates from the superimposed responses to single pulses.

The above-indicated formula $y(t) = F[x(t)]$ indicates a method which is particularly well suited for the study of biological systems. In operation, a stimulus $x$, is applied to the system, and the output $y$, is noted. The Wiener formulation demands that the stimulus is a Gaussian random sequence which by its nature contains nearly all possible stimuli, thus the resulting characterization contains information about the system's response to nearly all stimuli. It can be shown that by multiplying ternary versions of $x$ with values of $y$ the $h_0$, $h_1$ and $h_2$ Wiener kernels can be approximated quite closely.

With the growing interest in the study of non-linear systems, it becomes important to be able to compute these kernels. The determinations for the kernels $h_0$ and $h_1$ have not been found to be difficult. The $h_0$ kernel is normally equal to the average of the response $y$. The $h_1$ kernel is determined by correlating the quasi-random input $x$ with the output $y$. The definition of $h_2$ involves a double correlation involving two inputs (two $x$'s)$^2$ and one output ($y$). In many cases the value of the higher order kernels above the second order is so small as to be insignificant, and thus may be disregarded.

Calculating the kernels $h_1$ and $h_2$ usually involves an expensive and sophisticated computer system to perform the required correlations. As indicated, the $h_0$ kernel is simply determined by the average value of the $y$. The $h_1$ kernel requires a firstorder correlation which is also simple and does not require many operations. However, the algorithms required for determining the $h_2$ kernel requires many arithmetic operations. For example, if a first order kernel requires 32 operations, then the second order kernel typically requires 1024 or more operations. This is expensive to perform on a general purpose computer and is also very time comsuming.

OBJECTS AND SUMMARY OF THE INVENTION

It is an object of this invention to provide a relatively simple and inexpensive calculator for determining first and second order kernels.

Yet another object of this invention is to provide a novel and useful calculator for determining first and second order kernels more rapidly than heretofore, i.e. on line.

The foregoing and other objects of the invention may be achieved in an arrangement whereby the signals $x$ which are applied to a system under test are bandlimited white-noise signals. Apparatus for producing white-noise signals is described in an article by Don Lancaster published in Radio Electronics Magazine in April, 1975, pages 42–49 and entitled "Understanding Pseudo-Random Circuits."

The white-noise signal $x$ is used directly for the stimulus, then it is converted into a ternary signal wherein the ternary $x$ is set equal to +1 when $x$ is above a certain level, −1 when $x$ is below a lower level, and in between these levels the ternary $x$ is set equal to 0. The output of the system $y$ is converted to a digital number having a sign bit.

For determining $h_1$, multiplications occur between a present $y$, and present and past ternary $x$'s. Since ternary $x$ is $+1$, $-1$ or 0, multiplication operations reduce to add, subtract or skip. Initially each product is stored in a separate memory location. The number of past ternary $x$'s saved determines the total number of memory locations required and also the maximum number of points computed for the kernel. After all multiplications have been performed, a new $y$ and ternary $x$ are selected; the previous $y$ and oldest ternary $x$ are discarded. The sequence of multiplications is repeated with the product adding to the contents of the memory locations as defined above. As this processing repeats for new $y$'s and ternary $x$'s, a CRT displays the growing accumulation. Optionally, the CRT can hold the display at any point of the processing, while further processing occurs undisplayed by the CRT. After a preset period of time or other index the memory resets to zero and begins the accumulations again for a new period.

The $h_2$ kernel is computed in a similar fashion except that each multiplication is between a present $y$ and two present or previous ternary $x$'s. Again the multiplications reduce to adds, subtracts or skips. The options available for controlling the CRT display are similar. However, $h_2$ is a 2-dimensional matrix of values, whereas $h_1$ is only 1-dimensional. The 2-dimensional array may be portrayed in standard 3-D formats or in a shades of gray array on the CRT face. In the latter case, each matrix value controls the intensity of a region of the CRT display.

DESCRIPTION OF THE PREFERRED EMBODIMENTS

Figure 1:
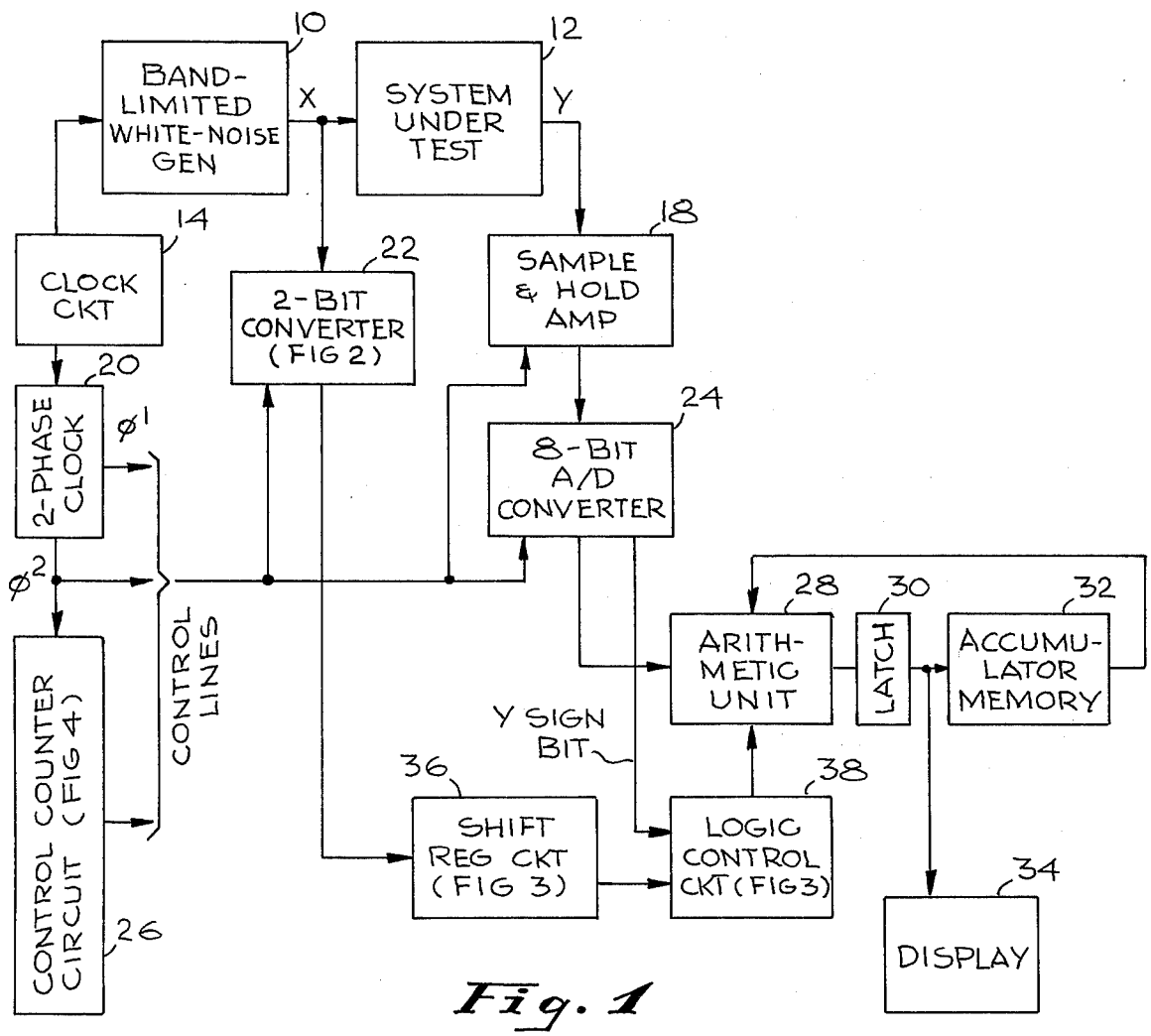
FIG. 1 is a block schematic diagram of an embodiment of the invention.

Referring now to FIG. 1, a system under test 12 has bandlimited white-noise signals $x$, applied thereto from a noise generator 10 which is driven in response to clock signals from a clock circuit 14. The output signals are designated as $y$. The clock circuit drives a two phase clock generator 20 whose outputs are designated as $\phi 1$ and $\phi 2$. A counter circuit system, designated a control counter circuit 26 is driven by $\phi 2$ clock signals. This is shown in more detail in FIG. 4.

A 2-bit converter 22 (shown in FIG. 2), connected to the white noise generator output, creates a ternary representation of $x$. Ternary $x$ is set equal to $+1$ when $x$ is greater than or equal to some specified threshold; ternary $x$ is set equal to $-1$ when $x$ is less than some specified lower threshold; and ternary $x$ is set equal to 0 when $x$ is between these two threshold levels. Two binary bits are used to represent $+1$, $-1$ and 0. The 2-bit conversion is triggered by an output from the control counter circuit 26. The 2-bit words are written serially into a shift register circuit 36, shown in FIG. 3.

A sample and hold amplifier 18 samples $y$ output from the system under study 12, at the same time the 2-bit conversion occurs. Then an 8-bit A/D converter circuit 24, connected to the sample and hold circuit output, converts $y$ into an 8-bit bipolar binary coded word which includes a sign bit. The circuit separates the unsigned portion hereafter called $y$ digital and the sign bit hereafter called $y$ sign.

This sampling of $x$ and $y$ is repeated until the shift register circuit 36 is filled with 2-bit versions of $x$. Then $y$ sign and present and past $x$'s are read sequenced by a logic control circuit 38 (shown in FIG. 3), to determine whether the present $y$ digital should be added to or subtracted from accumulated values stored in differentt memory locations of an accumulator memory 32 or whether the values stored in the memory locations should be left at the same values. The arithmetic operation requires a latch or buffer store 30 to be connected between the arithmetic unit and the accumulator memory. The output from this latch may be applied to a display interface 34, to be displayed.

Figure 2:
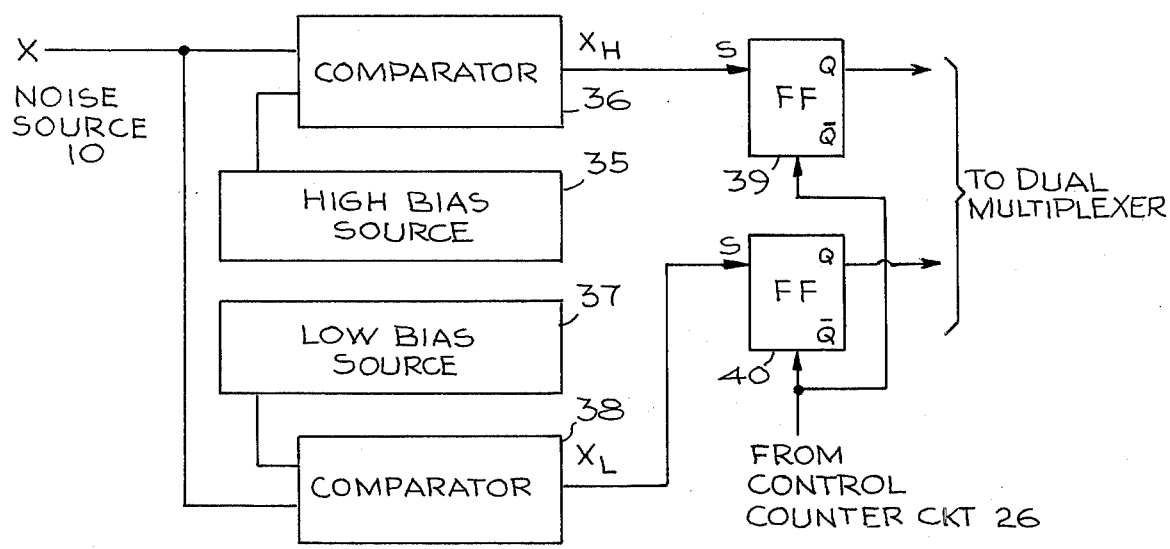
FIG. 2 is a block schematic diagram of a ternary converter and sampling flip flops which are used for this invention.

Referring now to FIG. 2 there is shown a block diagram of a 2-bit, or ternary converter. Analog values of $x$, derived from the output of the noise generator 10, are compared with voltage levels respectively provided by a high and low bias source, respectively 35 and 37, by comparators 36 and 38. These voltage or threshold levels establish a window for the ternary conversion described previously.

An output $x_H$ obtained from comparator 36, is high when $x$ is greater than the upper threshold level, and is low when $x$ is less than or equal to the upper threshold. Similarly an output $x_L$, obtained from comparator 38, is high when $x$ is greater than the lower threshold level and is low when $x$ is less than or equal to the lower threshold level.

From the foregoing, when $x_H$ and $x_L$ are high it is known that $x$ exceeds both thresholds and its ternary value is $+1$. When $x_H$ is low and $x_L$ is high, $x$ is between thresholds and its ternary value is 0. When $x_H$ and $x_L$ are both low, $x$ is below both thresholds and its ternary value is $-1$.

The $x_L$ and $x_H$ outputs of comparators 36, 38 are respectively applied to the set inputs of two flip flops, respectively 39, 40. These flip flops are of the type wherein, in the presence of a clock input, received from control counter 26, (FIG. 1) they will be driven to their reset states, but if an input to their set inputs is present at that time, they will be driven to their set states.

The outputs from the two flip flops represent the 2-bit, ternary values of $x$, i.e. $+1$, $-1$ or 0. Effectively therefore both of these signals are sampled and held by the flip flops 39,40. The resulting 2-bit digital words are then held available for application to the shift register circuits 36.

Figure 3:
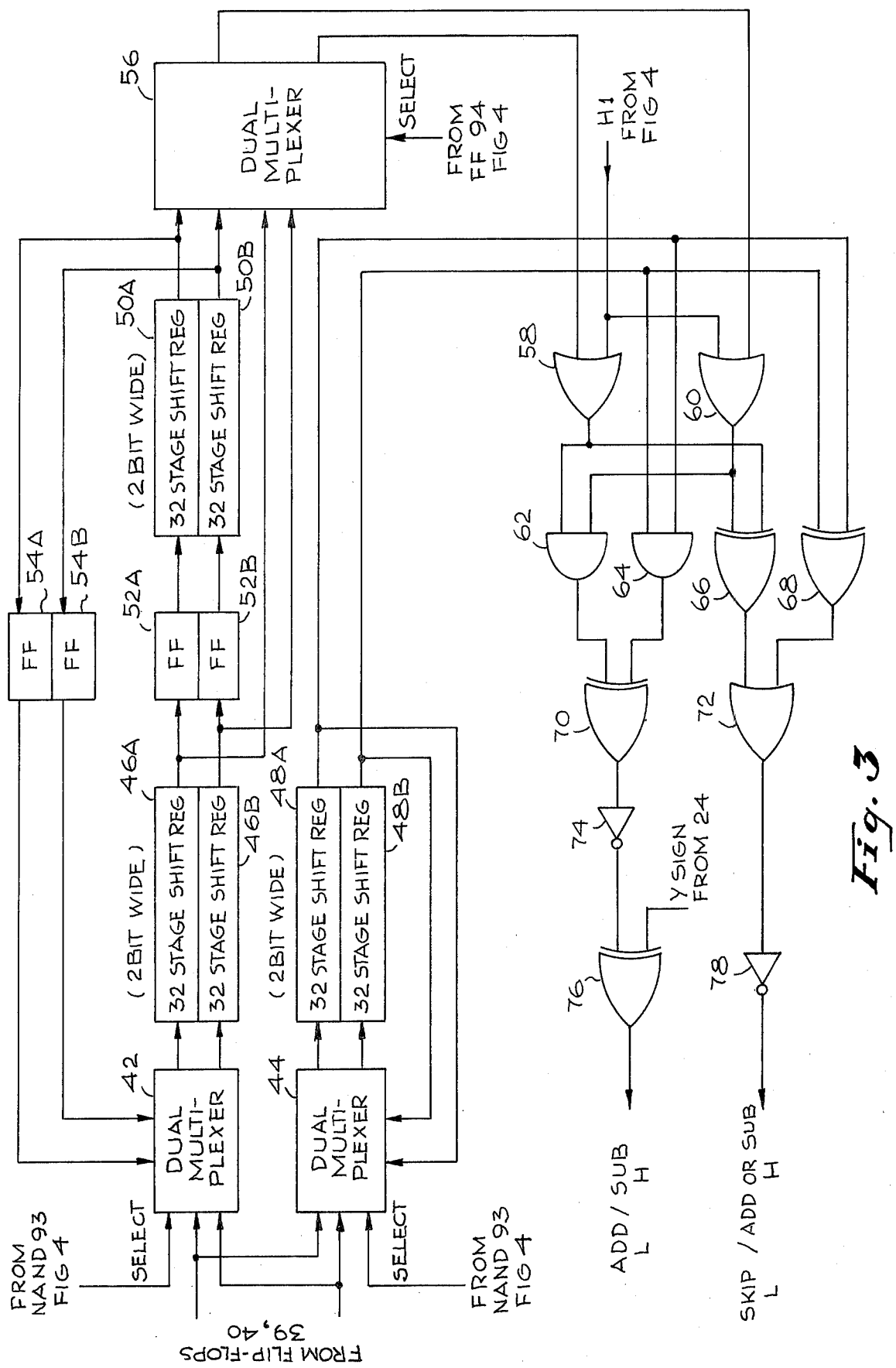
FIG. 3 is a block schematic diagram of the shift registers and logic control circuits which are employed with this invention.

FIG. 3 is a block schematic diagram of the shift registers 36 and logic control circuits. Dual multiplexers 42,44 receive the outputs of flip flops 39,40. The multiplexer outputs are respectively connected to two sets of registers respectively 46A, 46B and 48A,48B wherein each register set comprises two registers in parallel. A second input to dual multiplexer 42 are the outputs of dual flip flops 54A, 54B. A second input to dual multiplexer 44 is the output from the stages of registers 48A,48B. The select or switching line instructing dual multiplexer 42 to shift from one to the other of its inputs is received from a Nand gate 93 shown in FIG. 4. The select line of dual multiplexer 44 is also driven by the output of Nand gate 93, in FIG. 4. The last stages of registers 46A,46B drive dual flip flops 52A, 52B. Flip flops 52A and 52B in turn have their outputs connected to the first stages of dual registers 50A, 50B. The outputs from the last stages of dual registers 50A, 50B are applied to a dual multiplexer 56 and to the inputs of flip flops 54A, 54B. A second input to dual multiplexer 56 are the output from the last stages of shift registers 46A, 46B. Dual multiplexer 56 has its select line driven to switch its transferred inputs by the output of a flip flop 94, shown in FIG. 4.

The 2-bit or ternary values of $x$ are passed through dual multiplexers 42 and 44 and written in parallel into the first stages of dual registers respectively 46A,46B and 48A,48B. These dual multiplexers then switch such that the first stages of registers 46A, 46B see the output of dual flip flops 54A,54B and the first stages of registers 48A, 48B see its last stages.

Pairs of present and past ternary $x$'s are examined sequentially by circulating the registers and reading appropriate register stages. For the first 32 shifts the last stages of registers 46A, 46B and 48A, 48B are read. For the second 32 shifts the last stages of registers 50A, 50B and 48A, 48B are read, i.e., multiplexer 56 switches between last stages of registers 46A, 46B and 50A, 50B. This switching is repeated every 32 shifts for a total 1024 shifts. At this point the required processing is completed. However, registers 46A, 46B and 50A, 50B will not have returned to their initial states; therefore 2 more cycles of 32 shifts are performed to return the registers back to their initial states. Then dual multiplexers 42 and 44 switch the throughput so that new values of $x$ can be shifted into the first stages of registers 46A, 46B and 48A, 48B. Values of $x$ in flip flops 54A, 54B and in the last stages of registers 48A, 48B are shifted out of the register loops and are discarded.

After each shift of the registers, pairs of $x$'s are read into dual multiplexer 56, as described above. A multiplication between the two values is desired, but the ternary conversion forces the product to $+1$, $-1$, or 0. Gates 62 to 78 perform this desired mathematical operation.

Or gates 58, 60 each receive one of the two binary bits making up a ternary value of $x$ from the multiplexer 56. The other input to these Or gates is a signal H1, derived from the counters shown in FIG. 4, whose significance will be explained later. The output of Or gate 58 constitutes one input to an And gate 62 and exclusive Or gate 66. The output of Or gate 60 constitutes the other input to And gate 62 and exclusive Or gate 66. And gate 64 and exclusivve Or gate 68 receive the two binary bit outputs from the last stages of registers 48A, 48B.

An exclusive Or gate 70 receives the output of And gates 62 and 64. An Or gate 72 receives the outputs of exclusive Or gates 66 and 68. The output of exclusive Or gate 70 is applied to an inverter 74, whose output is one input to an exclusive Or gate 76. The other input to this exclusive Or gate is the sign of the $y$ digital number. Exclusive Or gates 66 and 68 apply their outputs to an Or gate 72. The output of Or gate 72 is applied to an inverter 78. The outputs of exclusive Or gate 76 and inverter 78 control the arithmetic unit 28, shown in FIG. 1, in a manner to be described.

In order to decide whether addition or subtraction will finally be required, the sign bit of $y$ must also be considered. Exclusive Or gate 76 receives an input designated $y$ sign, which affects a multiplication between the sign of $y$ and the product of ternary $x$'s. The output of exclusive Or gate 76 is low when addition is required and high when subtraction is required. The output of inverter 78 reflects whether either of two ternary $x$ inputs (one from multiplexer 56 and the other from registers 48A, 48B) was equal to zero, i.e., zero times any ternary $x$ and $y$ is zero, whereby a skip of the arithmetic, (no addition or subtraction) is required.

The above operations produce the double correlations required for calculating second order kernels. Or gates 58 and 60 provide a change in logic for computing first order kernels. Only a first order correlation between $x$ and $y$ is required for first order kernels; therefore one of the $x$'s is effectively set equal to $+1$ during shifts 993 to 1024 of the shift registers by making the $H_1$ signal high during this period. This has the same effect as if both inputs to Or gates 58 and 60 from multiplexer 56 are high and thus represent $+1$.

When both outputs from Or gates 58 and 60 are high, indicative of $+1$, the output of And gate 62 is high and the output of exclusive Or gate 66 is low. If both outputs from shift registers 48A, 48B are also high, then the output of And gate 64 is high and the output of exclusive Or gate 68 is low. Exclusive Or gate 70 provides a low output. This is inverted by inverter 74. If the $y$ sign is high, and the output of the exclusive Or gate 76 is low, then the arithmetic unit will receive an add instruction, which is correct, since both ternary $x$'s are $+1$ and the $y$ sign is plus. If the $y$ sign is minus then the output of exclusive Or gate 76 will be high and a subtract instruction will be applied to the arithmetic unit by the output of the exclusive Or gate 76.

It was indicated that the outputs from exclusive Or gate 66 and 68 are low. Therefore, the output of Or gate 72 is low. This is inverted by inverter 78 and the high output of the inverter 78 represents an add or subtract instruction to the arithmetic unit.

Assume now that one of the ternary inputs to the logic circuit represents $-1$, and the other input represents $+1$ which is the situation when for example, both bits received from the dual multiplexer 56 are low and both bits from register 48 are high. The outputs from Or gates 58 and 60 are both low, as a result of which the outputs from And gate 62 and 64 are both low. The output of exclusive Or gate 70 is low as a result of which the output of the inverter 74, which is applied to exclusive Or gate 76, is high. If the $y$ sign is negative, the output of exclusive Or gate 76 will be low, as a result of which the arithmetic unit is instructed to add, which is the correct situation when two negative signs are multiplied by a positive sign.

Low outputs are received by Or gate 72 from exclusive Or gate 66 and 68. The low output response thereto by Or gate 72 is inverted by inverter 78 providing a high output which confirms the add or subtract instruction received from exclusive Or gate 76.

If the $y$ sign, under the above circumstances was positive, then there would have been a high output from the inverter 78 which would indicate a subtract instruction to the arithmetic unit, which is correct since the process of multiplication multiplies a plus, a minus and a plus sign.

In the event that the output from shift registers 48A, 48B represents $+1$, where both lines are high and the output from the dual multiplexer 56 represents 0, where one of the lines is high and the other is low, then the following results.

The output from Or gate 58, which, by way of example receives the low line, is low, and the output from Or gate 60 is high. In this event, a low output is received from And gate 62, and a high output is obtained from exclusive Or gate 66. It should be appreciated that opposite low and high states of the respective lines out of dual multiplexer will never occur. The output from exclusive Or gate 70 is high because a high output is received from And gate 64, and a low output received from And gate 62. Inverter 74 inverts this and applies its low output to exclusive Or gate 76. If the $y$ sign is positive, the output from exclusive Or gate 76 is high indicating a subtract operation. If the $y$ sign is low the output from exclusive Or gate 76 is low, indicating an add operation. Or gate 72, in view of the high input received from exclusive Or gate 66, will provide a high input to inverter 78. The output of inverter 78 is low constituting a skip instruction to the arithmetic unit which overrides any instruction received from the exclusive Or gate 78. It should be appreciated that when the output from the dual multiplexer represents +1 and the output from shift registers 48A, 48B represents zero, the same result would be obtained.

From the foregoing description it should be appreciated how the control circuits in response to the ternary $x$ inputs and the signs of $y$ instruct the arithmetic unit to either add the present value of $y$ to the accumulated value of $y$ sent back from the memory, or to subtract the present value of $y$ from the accumulated value of $y$ sent back from the memory, or to return the accumulated value of $y$ back to the memory without addition or subtraction.

It was previously indicated that for calculating the kernel $h_1$, the $H_1$ input to Or gates 58 and 60 is made high. Accordingly, this has the same result as if the output from the dual multiplexer is +1. The logic control circuits function in the manner previously described, only one input in constantly +1 whereby the control circuits will respond only to the ternary value of $x$ received from the shift registers 48A, 48B and the sign of $y$.

Figure 4:
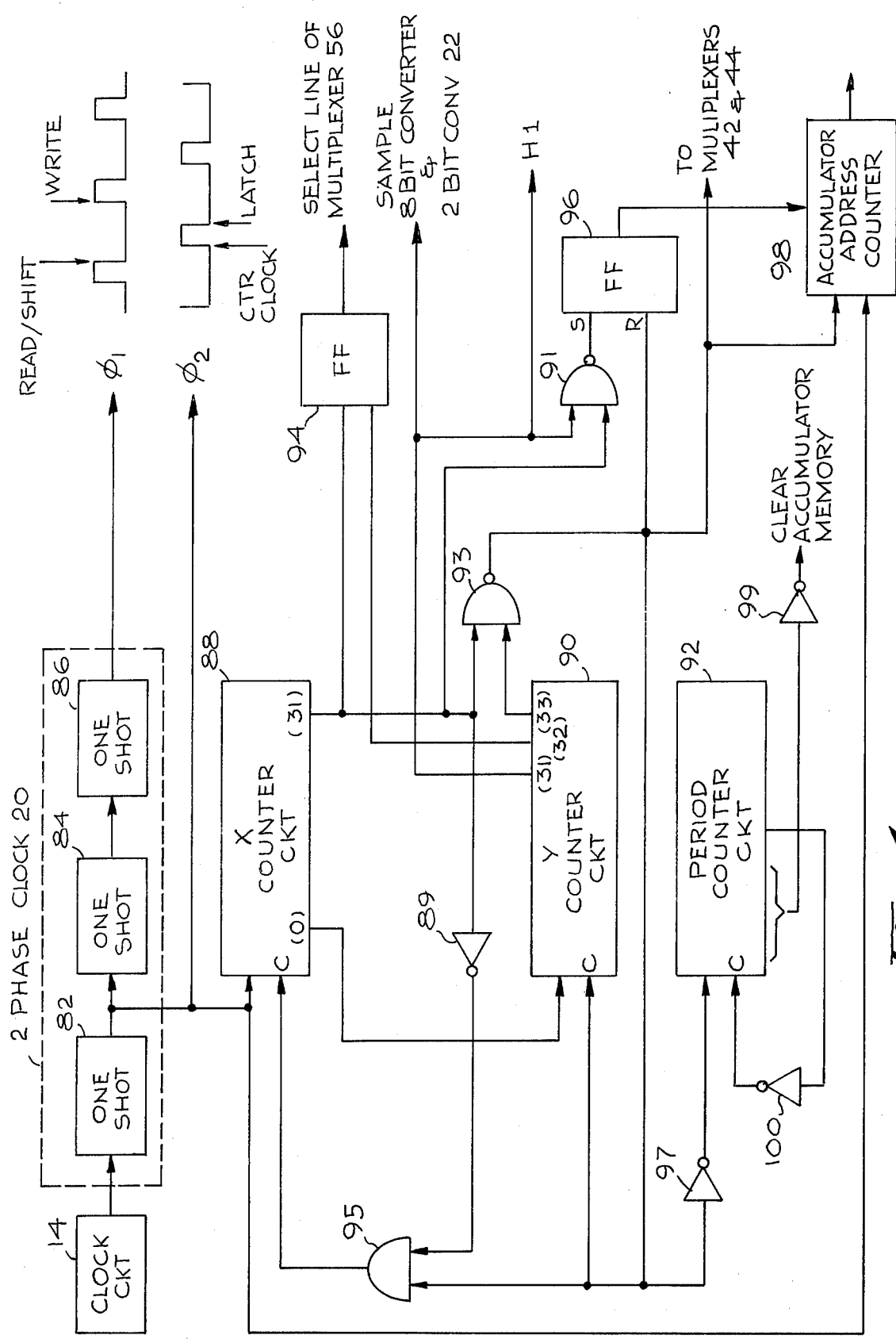
FIG. 4 is a block schematic diagram of a sequencing arrangement employed with this invention.

FIG. 4 is a block schematic diagram of the details of the two phase clock 20, and the control counter circuit 26, shown in FIG. 1. A clock circuit 14, drives the two phase clock arrangement 20. This comprises three serially connected one shot circuits respectively 82, 84, 86. The output from the last one-shot circuit 86 is the phase one clock ($\phi$1) and as indicated on the drawing on the trailing edge of the pulse read and shift operations occur and on the leading edge of the pulse writing into the accumulator memory occurs. The output of the one shot 82 constitutes the phase 2 ($\phi$2) clock. As indicated on the drawing the leading edge of a pulse from the one shot 82 drives an $x$ counter circuit 88 and also an accumulator address counter 98. The accumulator address counter addresses the accumulator memory. The trailing edge of a phase two output is used for triggering the latch circuit 30, shown in FIG. 1, and applying its contents to the accumulator memory 32.

The $x$ counter 88 has a count capacity of 31. The zero count output of the $x$ counter 88 clocks a $y$ counter circuit 90, which has a 33 count capacity. The 31st count of the $x$ counter 88, through inverter 89 and the And gate 95, resets the counter to zero, and also drives a toggle flip flop 94, which causes the multiplexer 56 to change its selection from the output of shift register 50A, 50B to the output of the shift register 46A, 46B.

The 31st count of the $y$ counter 90, causes a new sampling of the $x$ and $y$ data points by the two-bit converter 22 and the sample and hold circuit 18, shown in FIG. 1. This 31st count also provides the $h_1$ signal to the Or gates 58 and 60 in FIG. 3. The combination of the 31st count of the $x$ counter 88 and the 31st count of the $y$ counter 90, are applied to a Nand gate 91. The output of this Nand gate in response to these two inputs is applied to a flip flop circuit 96 causing the output which is applied to the accumulator address counter 98 to go low which causes the address counter to be disenabled. The 32nd count from the $y$ counter 90 resets toggle 94.

The combination of the 31 count output of $x$ counter 88 and the 33 count output of $y$ counter 90 is applied to a Nand gate 93. The output of Nand gate 93, in response to its two inputs sets the output of flip flop 96 which is applied to the address counter 98 to go high which enables the accumulator address counter to commence functioning. The output of Nand gate 93 is also applied to multiplexers 42 and 44 in FIG. 3 causing them to switch their inputs from those received from flip flops 39 and 40 to respectively receive the output from flip flops 54A, 54B and from the last stage of the shift register 48A, 48B.

The output of Nand gate 93 also functions to clear or reset both $x$ and $y$ counters, 88, 90. Finally, the output of Nand gate 93 is applied to an inverter 97, the output from which is applied to a period counter circuit 92 causing it to advance its count.

The period counter 92 determines the number of samples which will be selected for accumulation before resetting the accumulator memory to zero. This number is selectable by the user. This counter also assures that all $x$ registers have been filled before beginning the actual accumulation, i.e., a clear memory signal persists until the registers have become filled. This is accomplished by applying all counts from the period counter circuit during the filling period to an inverter circuit 99, whose output maintains the accumulator memory clear. When the period counter circuit reaches a predetermined nth count, its output is applied to an inverter circuit 100, which clears the period counter with its output.

The accumulator address counter 98 provides the correct address for the accumulator memory 32 of FIG. 1.

The $h_1$ values may be displayed by modulating the amplitude for $y$ displacement of a cathode ray tube electron beam as it is being moved in the $x$ direction. Alternatively, the calculated $h_1$ values may be printed out. The $h_2$ display conveys a great deal more information about a system under test than does the $h_1$ display. For example, $h_2$ displays are recorded of systems under test, which are not stressed. Then by applying various degrees of stress and by producing $h_2$ displays for each degree of stress, one can record these displays and store them as a library for comparison with a new system under test to therefore afford a diagnosis as to the extent of a stress which the system under test is either presently undergoing or has undergone in the past which has left its mark on the system. When the system under test is a biologic system, a diagnosis of the malfunction of the system may be made by comparing the $h_2$ display of a normally functioning system with the display of the system under test. Diagnosis of the malfunction may be obtained by comparing the display of the system being tested with previous displays. The $h_2$ values may be printed out or, if displayed on a cathode ray tube system, the $h_2$ values, as indicated previously herein may be used to modulate the intensity of the electron beam as it is being displaced in a scanning mode.

There has accordingly been described and shown above a novel and useful arrangement for computing non-linear kernels whereby a characterization of a non-linear system may be obtained.

We claim:

1. Apparatus for determining the characteristics of a system to which there is applied a band-limited white-noise signal, x, in response to which a y output signal is produced, said apparatus comprising:

means for establishing sampling intervals of said y output signal, means for quantizing an x signal during a sampling interval into a ternary signal, means for converting a sample of said y output signal to digital signals including a sign signal during a sampling interval, means for storing a predetermined number of said ternary signals, means for sequentially combining the stored ternary signals and the sign of said y digital signal to provide an add, subtract or skip instruction signal, an arithmetic means responsive to instruction signals for adding, or subtracting or skipping signals applied to its two inputs, and then in response to each instruction signal providing a sum, or difference output, or one of its inputs as an output, accumulator memory means for successively storing each output of said arithmetic means, means for applying to one input of said arithmetic means the most recent output from said arithmetic means, means for applying said y digital signals to the other input to said arithmetic means whereby said arithmetic unit adds, or subtracts its inputs, or does neither, in response to said instruction signals, and means for displaying the contents of said accumulator memory means.

2. A system as recited in claim 1 wherein said means for quantizing said x signal into ternary signals includes means for establishing an upper bias level voltage and a lower bias level voltage spaced therefrom, means to which said upper and lower bias level voltages and x signals are applied for producing a positive indicating ternary signal when said x signal exceeds said upper bias level voltage, a negative indicating ternary signal when said x signal is less than said lower bias level voltage, and a zero indicating ternary signal when said x signal is between said upper and lower bias level signals.

3. A system as recited in claim 2 wherein said means for storing a predetermined number of said ternary signals includes first shift register means, second shift register means having a storage capacity greater than said first shift register means, and means for entering ternary signals into both said first and second shift register means until said second shift register means is filled.

4. A system as recited in claim 3 wherein said means for sequentially combining the stored ternary signals and the sign of said y digital signals for computing $h_1$ kernels includes means for sequentially reading said ternary signals out of said first storage register means, and means to which said y sign signal and each of said read out ternary signals are applied, responsive to a positive y sign signal and positive indicating ternary signal for producing an add instruction signal, to a negative y sign signal or negative indicating ternary signal for producing a subtract instruction, and to a zero indicating ternary signal for producing a skip instruction.

5. A system as recited in claim 3 wherein said means for sequentially combining the stored ternary signals and the sign of said y digital signals for computing $h_2$ kernels includes means sequentially reading said ternary signals out of said first storage register means, means for reading out all of the ternary signals from said second storge register means for every ternary signal read out of said first storage means, and means to which said y sign signal and the ternary signals from said first and second storage register means are applied for producing an add instruction signal in response to all three signals being positive indicating or two signals being negative indicating and one signal being positive indicating, for producing a subtract instruction signal in response to one signal being negative indicating and two signals being positive indicating, or all three signals being negative indicating, and for producing a skip instruction signal in response to one of said ternary signals being zero indicating.

6. A system as recited in claim 3 wherein said second shift register means includes a third and fourth shift register having the same capacity as said first shift register means, a first and second one stage register means, means for connecting said first one stage register means between the output of said third shift register and the input to said fourth shift register, means for connecting said second one stage register means between the output of said fourth shift register and the input to said third shift register, means to apply said ternary signals to the input to said third shift register, and means to alternately derive a ternary signal either from said third shift register output or from said fourth shift register output each time a ternary signal is derived from the output of said first shift register means.

7. Apparatus as recited in claim 1 wherein there is included, means responsive to said means for sequentially combining the stored ternary signals and the sign of said y digital signal after said sequentially combining means has combined the last of said stored ternary signals and the sign of said y signal for producing an end signal, counter means responsive to said end signal for enabling said means for sampling said x and y sample signals to produce a fresh sample x and fresh sample y signal, whereby said freshh sample x signal is converted to a fresh ternary signal and said fresh sample y signal is converted into a fresh y digital plus sign signal, means responsive to said end signal to enter said fresh ternary signal into said means for storing a predetermined number of said ternary signals and to eliminate therefrom one of said previously stored ternary signals, whereby said means for sequentially combining and said arithmetic means will process said ternary signals in said means for storing and said fresh y digital plus sign signal.

8. Apparatus for determining the characteristics of a system to which there is applied band limited white noise signals, x, in response to which y output signals are produced, said system comprising means for establishing sampling intervals, means for converting each x signal during a sampling interval to a plus signal if it exceeds a first predetermined threshold, to a minus signal if it is less than a second predetermined threshold which is different than said first predetermined threshold, and to a zero signal if it is in between said first and second predetermined thresholds, means for converting a y sample signal during a sampling interval to y digital signal plus y sign signal, means for sequentially combining the y sign signal with each of a predetermined number of said signals produced by said means for converting each x signal to produce in sequence one of, an add instruction signal, a subtract instruction signal or a skip instruction signal, an arithmetic means having two inputs and an output and responsive to an instruction signal for adding or subtracting the y digital signal to the content of each accumulator memory location or not adding or subtracting signals applied to its two inputs, and providing a sum or difference output, or one of its inputs as an output, accumulator memory means for successively storing each output of said arithmetic means, means for successively applying to one input of said arithmetic means the most recent output from said arithmetic means, means for suuccesively applying to the other input of said arithmetic means said y digital signal whereby said arithmetic means adds or subtracts its y digital signal inputs or does neither, in response to said instruction signal, and means for displaying the contents of said accumulator memory.

9. The method of determining the characteristics of a system to which there are applied band limited white noise signals, x, in response to which y output signals are produced, said method comprising establishing sampling intervals, converting said x signals occurring during sampling intervals to ternary signals, converting a y signal during a sampling interval to digital signals including a sign signal, storing a predetermined number of said ternary signals, sequentially combining the stored ternary signals and the sign of said y digital signal to provide an add, subtract or skip instruction signal, combining said y digital signals and a most recently computed accumulated value in response to said instruction signal to provide a new accumulated value, successively storing each new accumulated value, providing each new accumulated value for combination with said y digital signals in response to each sequentially derived instruction signal, and displaying said stored accumulated values.

10. The method as recited in claim 9 wherein said step of converting said x signals to ternary signals includes establishing an upper bias level voltage and a lower bias level voltage spaced therefrom, comprising an x signal with said upper and lower bias level voltages for producing a positive indicating ternary signal when the x signal exceeds the upper bias level voltage producing a negative indicating ternary signal when said x signal is less than said lower bias level voltage, and for producing a zero indicating signal when said x signal is between said upper and lower level bias voltages.

11. The method as recited in claim 10 wherein the step of sequentially combining the stored ternary signals and the sign of said y digital signal for providing an add, subtract or skip instruction signal includes sensing that the y sign signal is positive and the presence of either two positive or two negative ternary signals to produce an add instruction signal, sensing that either the y sign signal is negative or the presence of a negative indicating ternary signal to produce a subtract instruction signal, sensing that the ternary signal is a zero indicating ternary signal to produce a skip instruction signal.

12. The method as recited in claim 10 wherein the step of sequentially combining the stored ternary signals and y sign for providing an add, subtract or skip instruction signal includes, sequentially combining each ternary signal with evey other ternary signal for producing a skip instruction signal in the presence of a zero indicating ternary signal, for producing a preliminary add signal in the presence of two positive or two negative indicating ternary signals, and for producing a preliminary subtract instruction signal in the presence of a positive and a negative indicating ternary signal, and combining a y sign signal and the preliminary signal which has been produced by combining each ternary signal with every other ternary signal to produce an add instruction signal when the preliminary signal is a preliminary add signal and the y sign signal is positive, to produce a subtract instruction signal when the y sign signal is negative and the preliminary signal is a preliminary subtract signal, to produce a subtract instruction signal when the y sign signal is positive and the preliminary signal is a preliminary add signal and to produce an add instruction signal when the y sign signal is negative and the preliminary signal is a preliminary subtract signal.

* * * * *